(12) United States Patent
Tanaka et al.

(10) Patent No.: US 6,565,349 B1
(45) Date of Patent: May 20, 2003

(54) APPARATUS FOR PRODUCING OUTSERT MOLDED PARTS IN PRODUCTION LINE

(75) Inventors: Yukitaka Tanaka, Aichi (JP); Fusatomo Miyake, Aichi (JP)

(73) Assignee: Kabushiki Kaisha Tokai Rika Denki Seisakusho, Yaichi (JP)

( * ) Notice: Subject to any disclaimer, the term of this patent is extended or adjusted under 35 U.S.C. 154(b) by 0 days.

(21) Appl. No.: 09/356,212

(22) Filed: Jul. 16, 1999

(30) Foreign Application Priority Data

Jul. 24, 1998 (JP) .......................................... 10-209736

(51) Int. Cl.[7] .............................................. B29C 51/02
(52) U.S. Cl. ........................ 425/307; 425/315; 83/102; 264/157; 264/160
(58) Field of Search ................................ 425/308, 315, 425/122, 307, DIG. 108, 116, 126.1, 129.1, 302.1; 83/102; 264/157, 160

(56) References Cited

U.S. PATENT DOCUMENTS

| | | | | |
|---|---|---|---|---|
| 4,440,702 A | * | 4/1984 | Susnjara | 264/37 |
| 5,135,381 A | * | 8/1992 | Evans | 425/308 |
| 5,460,497 A | * | 10/1995 | Vismara | 425/4 R |
| 5,904,891 A | * | 5/1999 | Mizuno | 264/544 |

FOREIGN PATENT DOCUMENTS

JP            355090336 A    *   7/1980

* cited by examiner

Primary Examiner—Robert Davis
Assistant Examiner—Joseph S Del Sole
(74) Attorney, Agent, or Firm—Fish & Richardson P.C.

(57) ABSTRACT

A production line including a molding press for molding a resin on a strand of material and a cutting press for cutting parts from the strand. The production line feeds the strand at a uniform rate without slack. The cutting press includes a die that moves toward and away from the strand. The die moves transversely to the strand to transport cut parts.

9 Claims, 8 Drawing Sheets

Fig.7

| Process | Operation | Time (sec.) 0 — 5 — 10 — 15 — 20 |
|---|---|---|
| Molding Press B | Lower Upper Part 15 | S1 |
| | Injection/Swelling | S2 |
| | Cooling | S3 |
| | Lift Upper Part 15 | S4 |
| Cutting Press C | Position Lower Tool 20 | T1 |
| | Lift Die 39 | T2 |
| | Lower Upper Tool 22 | T3 |
| | Lift Upper Tool 22 | T4 |
| | Lower Die 39 | T5 |
| | Separate Lower Tool 20 | T6 |
| Retrieval | Robot R Movement | T7, T8 |
| | Retrieval | T9 |

APPARATUS FOR PRODUCING OUTSERT MOLDED PARTS IN PRODUCTION LINE

BACKGROUND OF THE INVENTION

The present invention relates to automated press lines, and more particulary, to an automated press line including presses, each performing a different process, that are connected to each other by a transferring apparatus.

Conventionally, a number of presses, each of which performs a different process, have been arranged along a line and connected to each other by a transferring apparatus to perform a continuous operation.

FIG. 8 shows a typical press line. As shown in FIG. 8, a press line 50 carries out three processes. In process A, which is a press process, a material S is bent. In process B, which is a molding press process, resin is outsert molded to the material S. In process C, which is a cutting press process, molded resin products formed on the material S are cut off. FIGS. 9(a), 9(b), and 9(c) each show the material S after completing processes A, B, and C, respectively.

The press line 50 includes an uncoiler 51. A strip of material S is stamped out into a predetermined shape during a preliminary stamping process and then wound about the uncoiler 51. The material S is fed from the uncoiler 51 by a first gripper feeder 52 to a press 53 to undergo bending (the completion of which is shown in FIG. 9(a)) and then to a molding press 54 to undergo resin molding (the completion of which is shown in FIG. 9(b)).

Afterward, a second gripper feeder 55 feeds the resin-molded material S to a buffer 56, where a buffer dryer 57 dries the resin. The buffer 56 provides the material S with slack, the amount of which is constantly maintained by a loop controller 58.

A third gripper feeder 59 then feeds the material S to a cutting press 60, which cuts out molded products P from the material S at cutting positions X as shown in FIG. 9(c). After the molded products P are cut off, the remaining margins of the material S are lifted away from the cutting position. A lower mold holding the molded products P is moved away from the cutting position so that the molded products P can be retrieved from the lower mold one at a time.

The molded products P are then inspected by an inspecting apparatus 61. A robot hand 62 subsequently carries the molded products to an automatic stocker 63 for storage.

The cycle time of the cutting press 60 differs from that of the molding press 54. Hence, if the material S were fed to the cutting press 60 from the molding press 54 in accordance with the cycle time of the molding press 54, the material S would interfere with the cutting press 60. This would hinder smooth delivery of the material S.

Therefore, the buffer 56 provides the material S with a constant amount of slack between the molding press 54 and the cutting press 60 so that the material S can be fed to the cutting press 60 from the molding press 54 in accordance with the cutting timing of the cutting press 60. However, the buffer 56 lengthens the press line 50.

When starting continuous production on the press line 50, the material S is first fed manually through processes A, B and C. That is, the material S is fed manually during the first cycle. Furthermore, when ending continuous production, the material S in the buffer 56 must be manually fed to the cutting press 60. As a result, the manual operations carried out when starting and ending continuous production prolong the production time.

The third gripper feeder 59 stops feeding the material S when detecting the trailing end of the material S. Thus, molded products P cannot be produced on the portion of the material S located between the third gripper feeder 59 and the pressing location of the cutting press 60. This wastes some of the material S.

SUMMARY OF THE INVENTION

Accordingly, it is an objective of the present invention to provide a press line having a shorter length.

To achieve the above objective, the present invention provides a part production line for producing molded parts. The production line includes a plurality of machines arranged in series. Each machine performs a different operation on a continuous strand of material to produce the molded parts. The production line also includes a base and a molding press for molding resin material to sections of the strand in a molding operation cycle. The molding press is mounted on the base. A cutting press separates portions of the strand, which include the resin material, from the strand in a cutting operation cycle. The cutting press is immediately downstream from the molding press and is mounted on the base. A conveyor intermittently transfers the strand along the production line. The conveyor feeds new sections of the strand into the cutting press and the molding press at the same speed and with the same timing.

In a further aspect of the present invention, a method of producing parts is proposed. The method includes intermittently feeding a strand of material through a production line. The production line includes a mold press and a cutting press. The method also includes molding resin material onto portions of the strand with the mold press, and cutting parts, which include the resin, from the strand with the cutting press. The cutting includes moving a die towards an upper tool to clamp the strand between the die and the upper tool and severing the parts from the strand. The method further includes returning the die to a position spaced from the strand after the cutting operation. The severed parts are retained by the die when the die is returned to the spaced position. Furthermore, the method includes moving the die in a direction transverse to the feed direction of the strand to deliver the parts to a retrieval conveyor.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7 is a chart showing the timing of a cutting press process;

DETAILED DESCRIPTION OF THE PREFERRED EMBODIMENTS

Figure 9C:
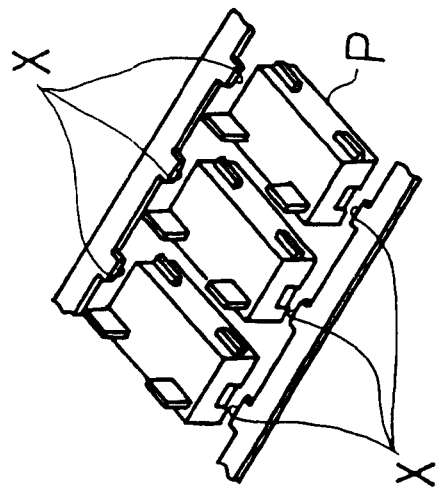
FIGS. 9(a), 9(b), and 9(c) are perspective views of a strip of material showing completion of various steps of the press line operation.
Figure 9B:
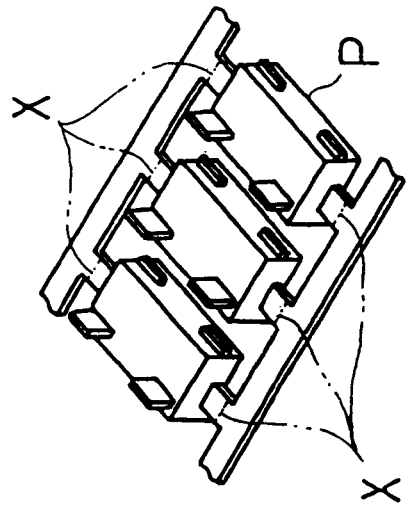
Figure 9A:
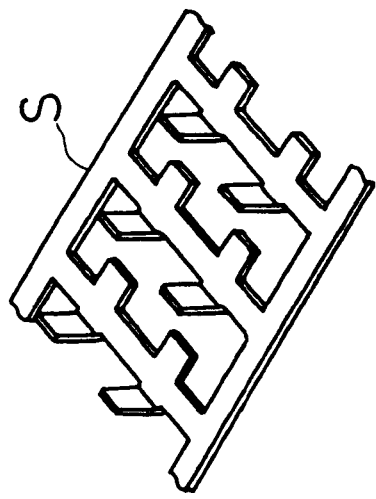

A preferred embodiment of the present invention will now be described with reference to FIGS. 1 to 7. The processes performed on material S by the prior art press line, the completion of which is shown in FIGS. 9(a) to 9(c), are also carried out in the press line of the preferred and illustrated embodiment.

Figure 1:
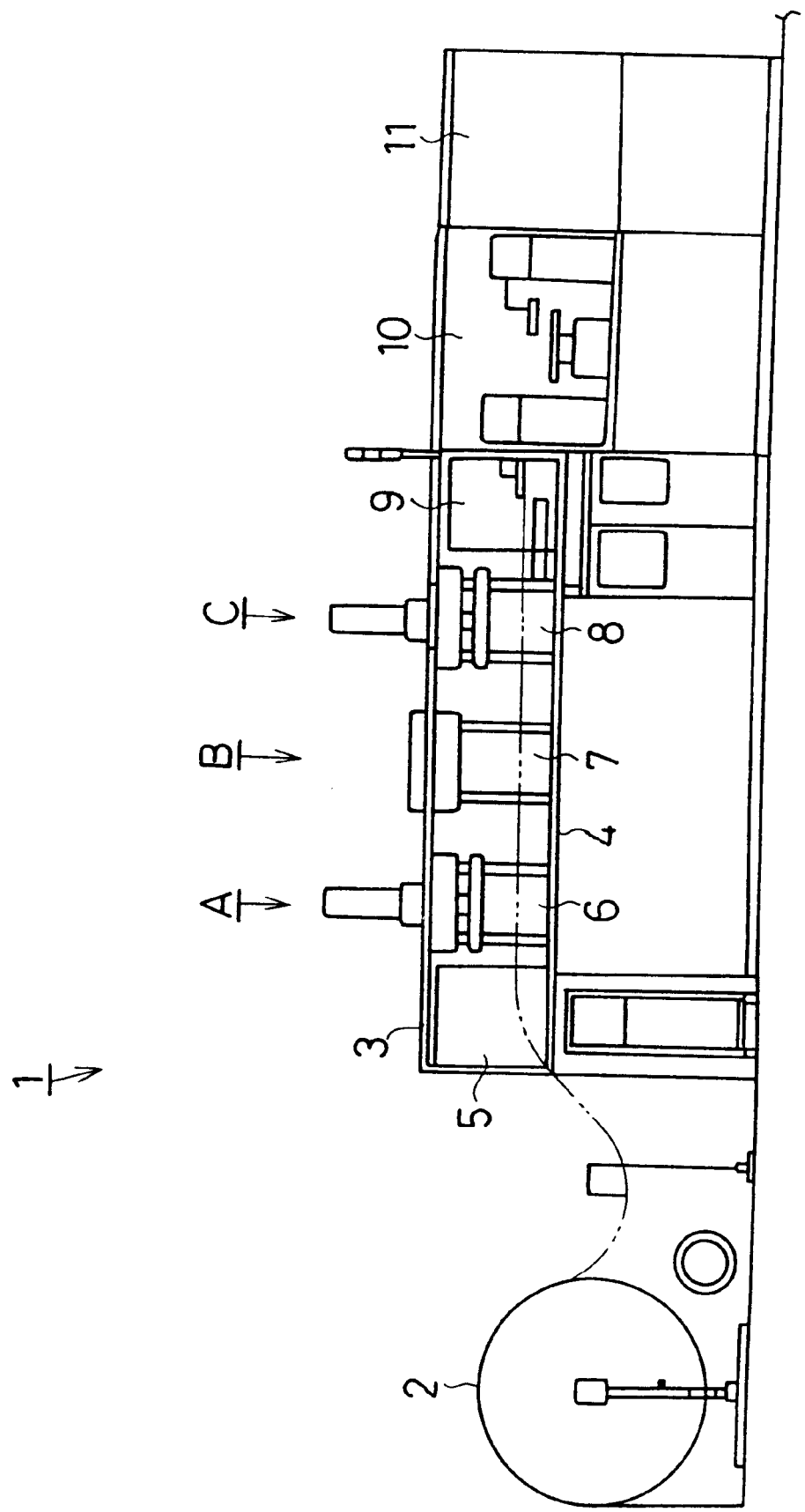
FIG. 1 is a side view showing a press line according to a first embodiment of the present invention.

As shown in FIG. 1, a press line 1 carries out three processes, a bending press process A, a molding press process B, and a cutting press process C.

A frame 3 is spaced from and downstream of an uncoiler 2. The frame 3 includes a common base 4. A first gripper feeder 5, a bending press 6, a molding press 7, a cutting press 8, and a second gripper feeder 9 are arranged on the base 4. The first and second gripper feeders 5, 9 each serve as a transferring apparatus. An inspecting apparatus 10 and an automatic stocker 11 are arranged downstream of the second gripper feeder 9 in the frame 3.

Figure 2:
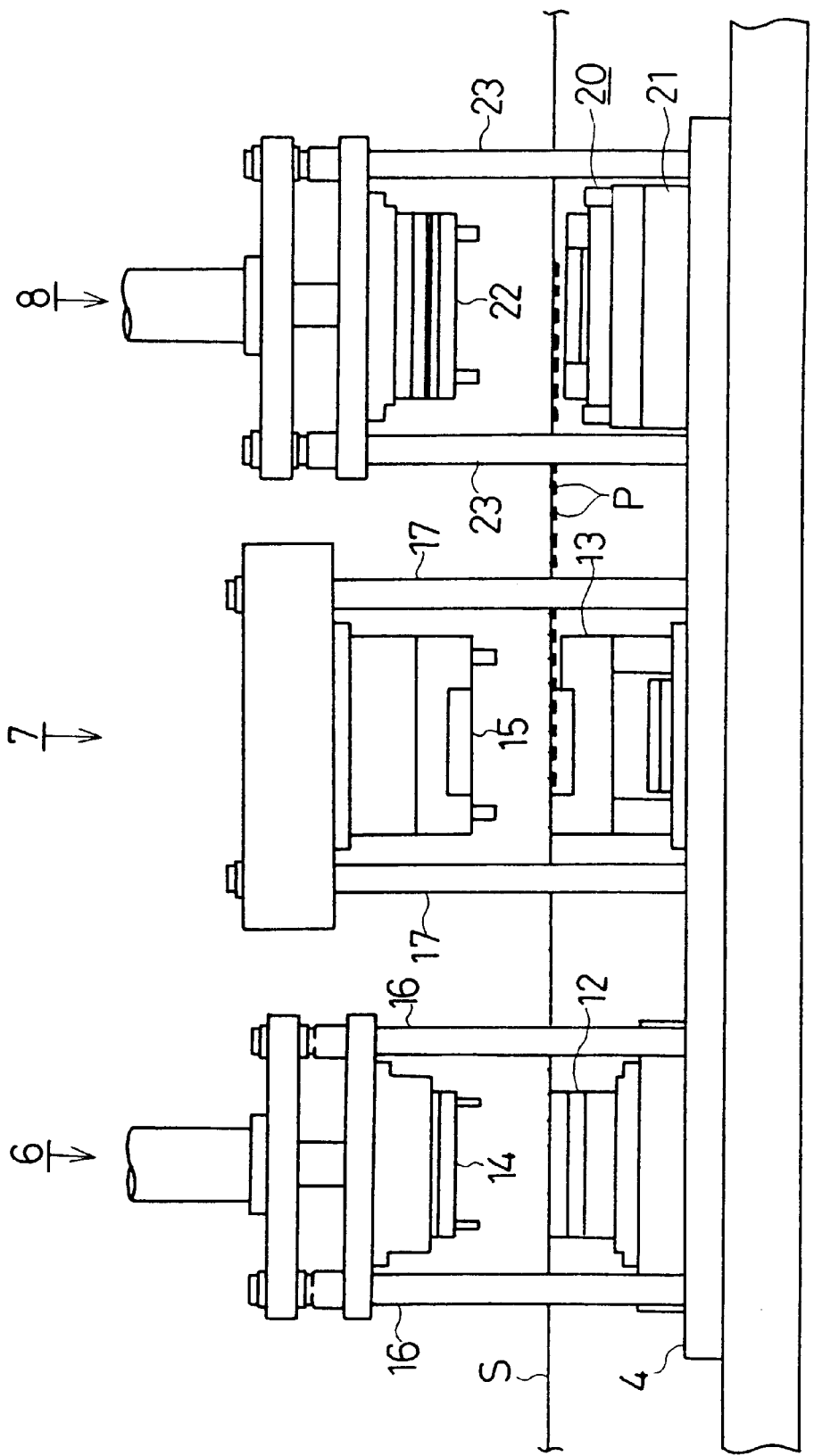
FIG. 2 is an enlarged partial side view showing the presses of FIG. 1.

As shown in FIG. 2, the bending press 6 has a lower part 12 and an upper part 14, and the molding press 7 has a lower part 13 and an upper part 15. The lower parts 12, 13 are fixed to the base 4. The bending press 6 includes columns 16 to support the upper part 14 in a vertically movable manner. The molding press 7 includes columns 17 to support the upper part 15 in a vertically movable manner.

The cutting press 8 has a lower tool 20 and an upper tool 22. The lower tool 20 is arranged on a bolster 21, which moves along the base 4. Columns 23 support the upper tool 22 in a vertically movable manner.

Figure 3:
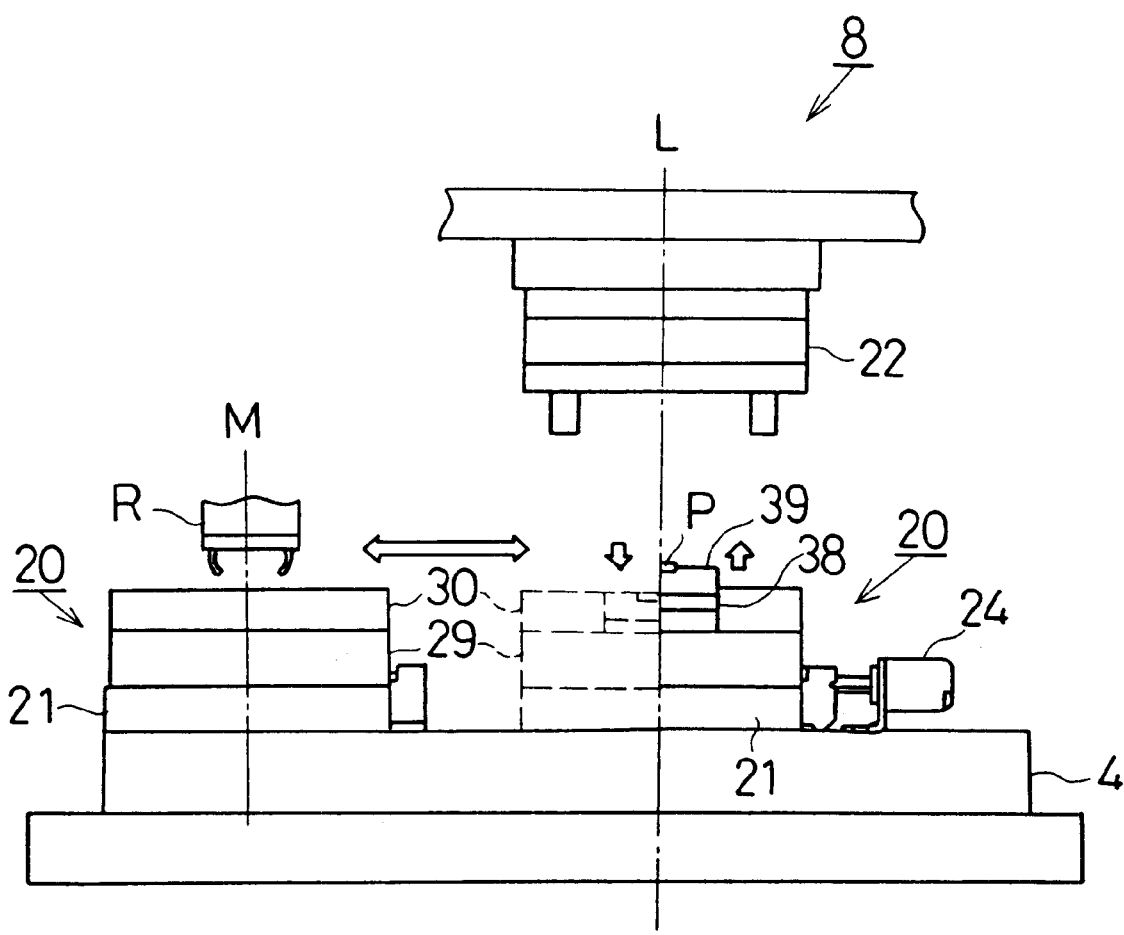
FIG. 3 is an end view showing the movement of a lower mold of the cutting press.

As shown in FIG. 3, a cylinder 24 is arranged at one side of the lower tool 20. The cylinder 24 moves (leftward and rightward as viewed in FIG. 3) the lower tool 20 of the cutting press 8 between a pressing location L and a retrieving location M. When the lower tool 20 is located at the pressing location L, the center axes of the lower and upper tools 20, 22 are aligned with each other. When the lower tool 20 is at the retrieving location M, the center axes of the lower and upper tools 20, 22 are offset from each other by a predetermined distance.

Figure 4:
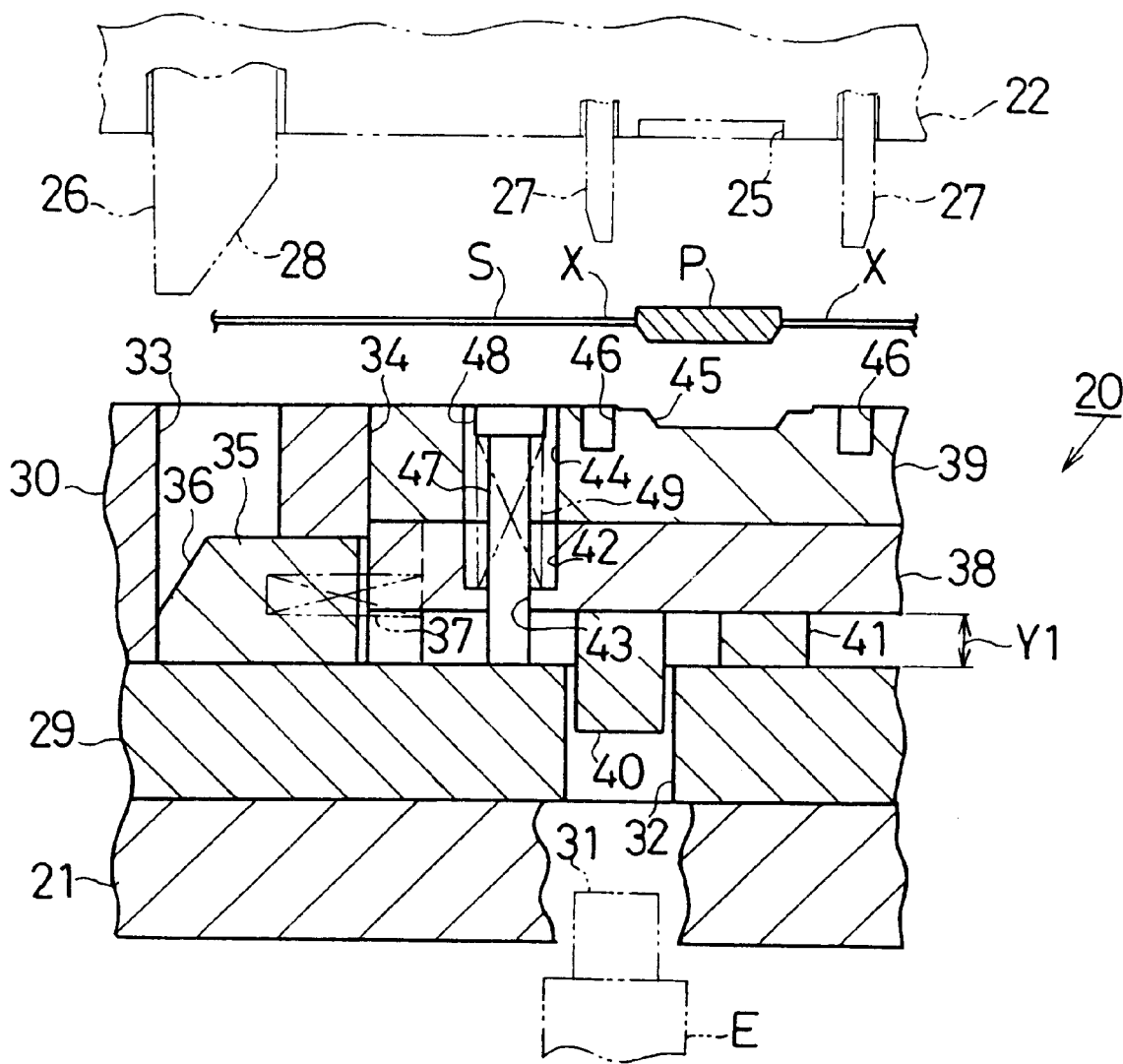
FIG. 4 is an enlarged partial cross-sectional side view showing the lower mold of the cutting press in a normal state.

The lower surface of the upper tool 22 includes four equally spaced indentations 25 (only one is shown in FIG. 4) that are shaped to conform to the molded products P. A cam 26 is supported by the upper tool 22. The distal end of the cam 26 includes an inclined cam surface 28.

The upper tool 22 includes eight punches 27 (only two are shown in FIG. 4), which cut off the molded products P from the material S. The punches 27 are located to correspond to the cutting positions X. The cam 26 and the punches 27 are projected from and retracted into the upper tool 22 by a driving mechanism (not shown).

The lower tool 20 of the cutting press 8 includes a support plate 29 and an upper plate 30. The support plate 29 and the upper plate 30 are arranged on the bolster 21.

An air cylinder E, which serves as a lifting device, is arranged below the support plate 29. The air cylinder E has a cylinder rod 31, which projects from and retracts into the cylinder E. A bore 32 is formed in the support plate 29 to receive the cylinder rod 31.

An L-shaped receptacle 33 extends through the upper plate 30 at a position corresponding to the cam 26. The receptacle 33 receives the cam 26. A slot 34 extends through the middle of the upper plate 30 near the receptacle 33. The slot 34 connects the receptacle 33 to the bore 32 of the support plate 29.

A follower block 35 is arranged on the upper surface of the support plate 29 in the receptacle 33. One end of the follower block 35 includes an inclined follower surface 36, which cooperates with the cam surface 28 of the cam 26.

A spring 37 is arranged adjacent to the follower block 35 to constantly bias the follower block 35 in an upstream or leftward direction (as viewed in FIG. 4). The leftward movement of the follower block 35 is restricted when the block 35 contacts the wall of the receptacle 33, which faces the block 35 and is perpendicular to the upper surface of the support plate 29.

An intermediate plate 38 and die 39 are arranged one upon the other in the slot 34. The intermediate plate 38 and the die 39 are vertically movable along the walls of the slot 34. The upper surface of the die 39 is flush with the upper surface of the upper plate 30 when in a normal state.

A lifter block 40 extends from the lower surface of the intermediate plate 38 into the bore 32 of the support plate 29. A support block 41 also extends from the lower surface of the intermediate plate 38 near the lifter block 40. The support block 41 has a smaller vertical dimension that the lifter block 40. The intermediate plate 38 is supported on the upper surface of the support plate by the support block 41 when in the normal state (the state of FIG. 4 in which the molded products P are not being cut).

In the normal state, the lifter block 40 is located in the bore 32 of the support plate 29, and the intermediate plate 38 and the support plate 29 are separated from each other by distance Y1, which corresponds to the height of the support block 41. A sink 42 is formed in the upper surface of the intermediate plate 38. A bore 43 extends downward from the bottom of the sink 42.

The die 39 has a bore 44, which is connected with the bore 43 of the intermediate plate 38, and four indentations 45 (only one is shown in FIG. 4), which are shaped to conform to the molded products P and are located opposite to the indentations 25 of the upper tool 22. Eight holes 46 (only two are shown in FIG. 4) are formed on the upper surface of the die 39 at locations corresponding to the punches 22 of the upper tool 22. Thus, four molded products P are cut off simultaneously.

A pin 47 is inserted through the bore 44, the sink 42, and the bore 43. The lower end of the pin 47, which extends through the lower surface of the intermediate plate 38, is fixed to the upper surface of the support plate 29. A head 48 is provided on the upper end of the pin 47. A spring 49 is arranged between the pin head 48 and the bottom of the sink 42 to constantly bias the intermediate plate 38 and the die 39 downward. Contact between the support block 41 and the upper surface of the support plate 29 restricts downward movement of the intermediate plate 38 and the die 39. In the normal state, which is shown in FIG. 4, the pin head 48 never projects above the upper surface of the die 39.

As shown in FIGS. 2 and 7, lowering of the upper part 15 to close the upper and lower parts 15, 13 of the molding press 7 (operation S1), injection and swelling (operation S2), cooling (operation S3), and, opening of the upper part 15

(operation S4) are performed during the molding press process B to outsert mold four molded products P on the material S.

The molding press 7 sends the material S, on which the molded products P are formed, to the cutting press 8 upon completion of each cycle. When the molded products P are fed out of the molding press 7, a new section of the material S, which has been bent in the preceding press process A by the bending press 6, is sent into the molding press 7. The molding press 7 then performs the molding press process B on the new section.

While the molding press process B is performed on the new section of the material S, the cutting press process C and retrieval of the four cut-off molded products P are performed within a time period shorter than the cycle time of the molding press process B. After the retrieval of the molded products P, new molded products P are sent into the cutting press 8. These operations are repeated until the continuous production is completed.

The cutting of the molded products P, which have been molded on the material S during the molding press process B, will now be described with reference to FIG. 3 and FIGS. 5 to 7. The cylinder 24, which is located on one side of the lower tool 20, is first driven to move the lower tool 20 from location M, which is offset from the upper tool 22, to location L, which is aligned with the upper tool 22 (operation T1).

The air cylinder E located below the support plate 29 is then driven to project the cylinder rod 31 into the bore 32. The cylinder rod 31 contacts and lifts the lifter block 40, which is located in the bore 32, into the slot 34. This moves the intermediate plate 38 and the die 39 upward against the biasing force of the spring 49 (operation T2).

Figure 5:
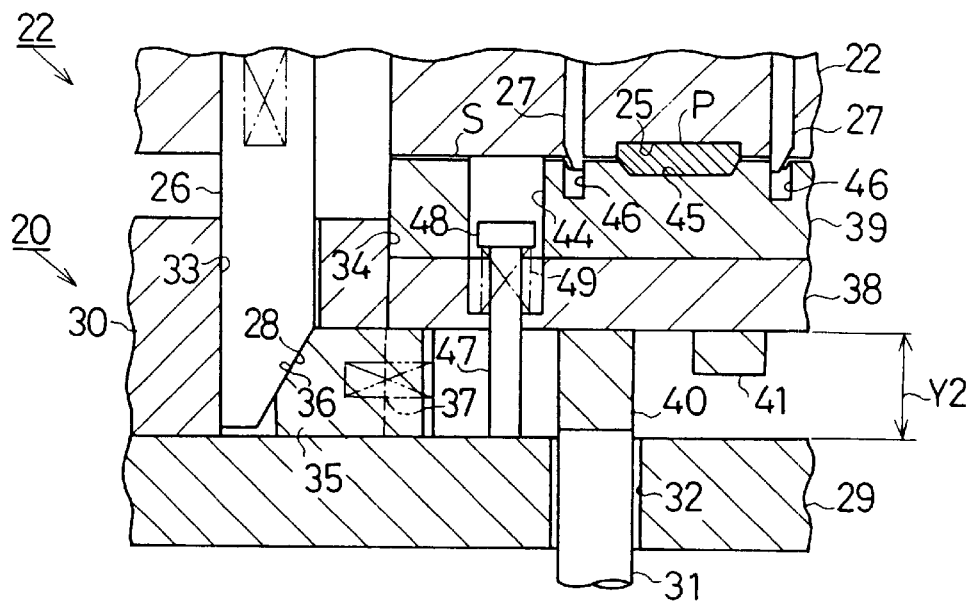
FIG. 5 is an enlarged partial cross-sectional side view showing the lower mold of the cutting press in a cutting state.

As a result, the die 39 moves above the upper surface of the upper plate 30, so that the upper surface of the die 39 contacts the material S. The lower halves of the molded products P are received in the indentations 45 of the die 39. In this state, the intermediate plate 38 and the support plate 29 are separated from each other by distance Y2, which is substantially the same as the height of the follower block 35, as shown in FIG. 5. This permits the follower block 35 to move into the space between the intermediate plate 38 and the support plate 29.

The upper tool 22 is then lowered by a driving means (not shown) toward the lower tool 20 to clamp the tools 20, 22 together (operation T3). In this state, the material S is held between the upper tool 22 and the die 39. The upper halves of the molded products P are received in the indentations 25 of the upper tool 22.

When the upper tool 22 is lowered and the tools 20, 22 are clamped together, the cam 26 is lowered into the receptacle 33 of the lower tool 20. This presses the cam surface 28 of the cam 26 against the follower surface 36 of the follower block 36, which moves the follower block 35 toward the right (as viewed in FIGS. 4 to 6). Hence, the follower block 35 is forced into the slot 34 between the intermediate plate 38 and the support plate 29 against the biasing force of the spring 37.

In this state, the punches 27 of the upper tool 22 are lowered toward the die 39 so that they pierce the material S at the cutting positions X (FIG. 9(b)) and cut off the four molded products P simultaneously. After piercing the material S, the punches 27 enter the corresponding holes 46. When cutting off the molded products P, the downward force applied to the die 39 is transmitted by the intermediate plate 38 and the follower block 35 to the support plate 29.

After the molded products are cut off, the cam 26 and the punches 27 are retracted into the upper tool 22 and the upper tool 22 is lifted away from the lower tool 20 to unclamp the tools 20, 22 (operation T4).

Figure 6:
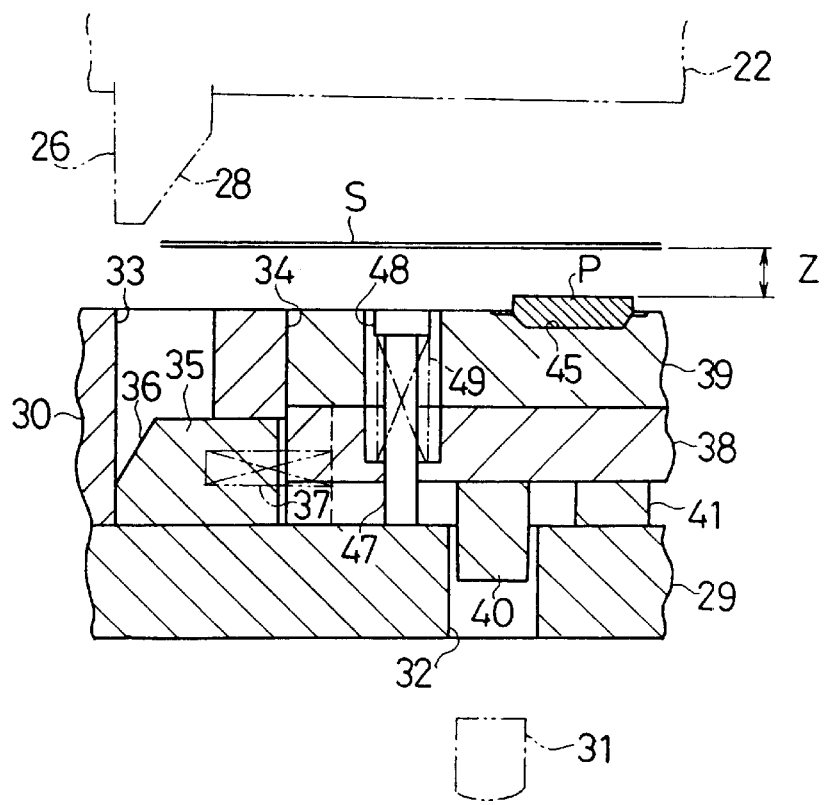
FIG. 6 is an enlarged partial cross-sectional side view showing the lower mold of the cutting press after cutting.
Figure 8:
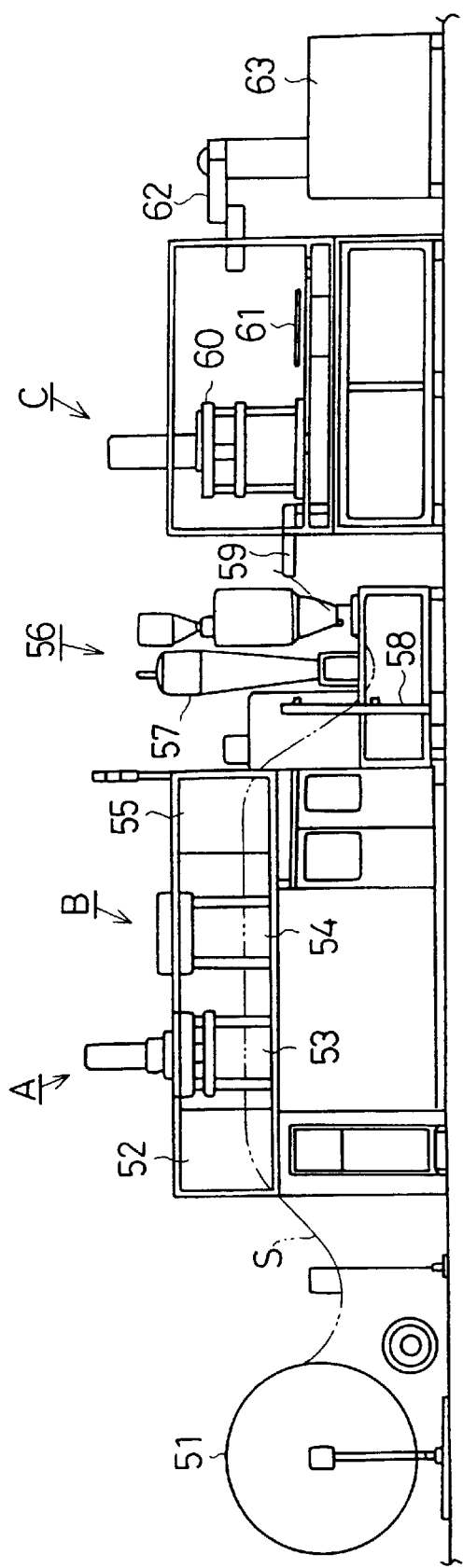
FIG. 8 is a side view showing a prior art press line.

As the cam 26 retracts, the biasing force of the spring 37 returns the follower block 35 to its original position, which is shown in FIG. 6. This permits the intermediate plate 38 and the die 34 to move downward along the walls of the slot 34.

The air cylinder E below the support plate 29 is then driven to retract the cylinder rod 31. With the assistance of the biasing force of the spring 49, this lowers the intermediate plate 38 and the die 39 and returns the support block 41 to a position contacting the upper surface of the support plate 29 (operation T5).

The cut-off molded products P are held in the indentations 45 of the die 39 as the die 39 moves downward. As shown in FIG. 6, this creates a gap Z between the molded products P and the material S and permits the material S to move without interference with the lower tool 20.

Afterward, the cylinder 24 is driven to move the lower tool 20 along the base 4 (toward the left as viewed in FIG. 3) to location M (operation T6). This enables retrieval of the molded products P.

A robot arm R (FIG. 3), which is located near the frame 3, is then moved to a position above the molded products P (operation T7).

Subsequently, the robot arm R simultaneously picks up the four molded products P, carries the products P to the inspecting apparatus 10, and then stores the products P in the automatic stocker 11 (operation T8).

After completing the retrieval of the molded products P, the robot arm R is returned to its original position (not shown).

Operations T1 to T9 are repeated until the continuous operation is completed.

The preferred and the illustrated embodiment has the advantages described below.

The lower parts 12, 13 and the lower tool 20 of the respective presses 6, 7, 8 are arranged on a common base 4, and the buffer 56 of the prior art is not necessary. Therefore, the length of the press line 1 is shortened compared to the prior art. Accordingly, the press line 1 occupies less floor space.

The shortened press line 1 decreases the time required for manual operation, which is required when starting continuous production. Furthermore, the material S need not be fed out of a buffer manually. This also decreases the manual operation time when starting continuous production.

The need for the third gripper feeder 59, which is used in the prior art, is eliminated. Thus, molded products P are produced from the material S even at locations close to the trailing end of the material S. Thus, material S is not wasted.

The lower parts 12, 13 and the lower tool 20 of the respective presses 6, 7, 8 are arranged on the same base 4. Thus, the presses 6, 7, 8 form a single apparatus, which simplifies maintenance.

The lower parts 12, 13 and the lower tool 20 of the respective presses 6, 7, 8 are arranged on the same base 4. Thus, the need for the buffer 56, the loop controller 58, and the third gripper feeder 59, which are used in the prior art, is eliminated. This decreases equipment costs.

After cutting off the molded products P, a gap Z is created between the material S and the molded products P, which are held on the die 39. Thus, the molded products P can be retrieved without interference between the material S and the lower tool 20 of the cutting press 8 even when the molding press process B is being performed.

When cutting off the molded products P, the cutting pressure applied to the lifted die 39 is transmitted by the follower block 35. This prevents damage to the die 39.

After cutting off the molded products P, the lower tool 20 is moved from location L to location M on the bolster 21. This simplifies the retrieval of the cut-off molded products.

Four molded products P are retrieved simultaneously whereas the molded products P are retrieved one at a time in the prior art. This improves production efficiency.

The die 39 is lifted and lowered by the air cylinder E and the spring 49, which are inexpensive parts. This decreases the cost of the press line 1.

The cam 26 and the follower block 35 are formed to receive the forces applied to the lifted die 39. This simplifies the structure of the lower tool 20 and the upper tool 22.

It should be apparent to those skilled in the art that the present invention may be embodied in many other specific forms without departing from the spirit or scope of the invention. Particularly, it should be understood that the present invention may be embodied in the following forms.

The support block 41 may be replaced by an elastic member, such as a rubber cushion. Furthermore, a spring, a hydraulic damper, or the like may be arranged between the support block 41 and the intermediate plate 38. Such structures would absorb the impact produced when lowering the die 39.

The springs 37, 49 may be replaced by hydraulic dampers, or the like. This would provide the same advantages as the preferred and illustrated embodiment.

The intermediate plate 38 and the die 39 may be formed integrally with each other. This would decrease the number of parts.

The type of uncoiler 2 employed is not limited. For example, the uncoiler 2 may have a single-mandrel type structure or a dual-mandrel type structure. The advantages of the preferred and illustrated embodiment would be obtained regardless of the type of uncoiler 2 used.

Furthermore, the uncoiler 2 may be replaced by a cradle straightener and the advantages of the preferred and illustrated embodiment would still be achieved.

The first gripper feeder 5 may be replaced by a roll feeder or an air feeder. Such feeders would also send the material S to the pressing positions of each press 6, 7, 8 in accordance with the pressing timing.

The press line 1 may include a coil car, which automatically mounts the material S on the uncoiler 2, and a leveller for straightening the material S. The advantages of the preferred and illustrated embodiment would still be achieved regardless of the additional equipment.

The present examples and embodiments are to be considered as illustrative and not restrictive, and the invention is not to be limited to the details given herein, but may be modified within the scope and equivalence of the appended claims.

What is claimed is:

1. A part production apparatus for producing molded parts, the production apparatus including a plurality of machines arranged in series wherein each machine performs a different operation on a continuous strand of material to produce the molded parts, the production apparatus comprising:

a frame including a base;

a molding press for molding resin material to sections of the strand in a molding operation cycle, the molding press being mounted on the base;

a cutting press for separating portions of the strand, which include the resin material, from the strand in a cutting operation cycle that is different from the molding operation cycle, wherein the cutting press is immediately downstream from the molding press and is mounted on the base, the cutting press including a pair of opposed tools that cooperate to clamp the strand from opposite sides of the strand, the tools being separated from the strand when unclamped, wherein the pair of tools includes a first tool and a second tool, the second tool including a cam, the first tool including a die and a follower, the die cooperating with the strand, the follower cooperating with the cam and moves into a position between the die and a support plate when the pair of tools are clamped together for transmitting force from the die to the support plate; and a conveyor for intermittently transferring the strand along the production apparatus and for feeding new sections of the strand into the cutting press and the molding press at the same speed and with the same timing;

wherein the strand is held at a first level in the cutting press prior to separation of the portions, and the portions are moved to a second level within the cutting press after being separated from the strand that is remaining so as to allow the strand to continue transferring along the production apparatus without being obstructed by the separated portions.

2. The production apparatus according to claim 1, wherein the first tool includes a spring to bias the first tool away from the strand and a driver mechanism for driving the first tool toward the strand.

3. The production apparatus according to claim 1, further comprising a bolster for movably supporting the first tool along the base.

4. The production apparatus according to claim 1 further comprising a retriever conveyor for simultaneously removing a group of parts from the cutting press.

5. A part production apparatus for producing molded parts, the production apparatus including a plurality of machines arranged in series, wherein each machine performs a different operation on a continuous strand of material to produce the molded parts, the production apparatus comprising:

a frame including a base;

a molding press for molding resin material to sections of the strand in a molding operation cycle, the molding press being mounted on the base; and a cutting press for separating portions of the strand, which include the resin material, from the strand in a cutting operation cycle that is different from the molding operation cycle, wherein the cutting press is immediately downstream from the molding press and is mounted on the base, the cutting press including a pair of opposed tools that are clamped together in a cutting process, wherein the pair of opposed tools are spaced apart from each other and that the portions after separation are moved to a level different from the strand when the opposed tools are unclamped to permit unobstructed relative movement between the strand and at least one of the tools, wherein the pair of tools includes a first tool and a second tool, and the second tool includes a cam and the first tool includes a support plate, a die, which is located above the support plate, and a follower, which is located on and movably supported by the support plate and faces the cam, wherein the follower cooperates with the cam, and the die cooperates with the strand, wherein the follower is moved into a position between the die and the support plate by the cam when the tools are clamped together for transmitting force from the die to the support plate.

6. The production apparatus according to claim 5 further comprising a conveyor for intermittently transferring the strand along the production apparatus and for feeding new sections of the strand into the cutting press and the molding press at the same speed and with the same timing.

7. The production apparatus according to claim 5, wherein the first tool includes a spring to bias the first tool away from the strand and a driver mechanism for driving the first tool toward the strand.

8. The production apparatus according to claim 5, further comprising a bolster for movably supporting the first tool along the base.

9. The production apparatus according to claim 5 further comprising a retriever conveyor for simultaneously removing a group of separated parts from the cutting press.

* * * * *

UNITED STATES PATENT AND TRADEMARK OFFICE
CERTIFICATE OF CORRECTION

PATENT NO.     : 6,565,349 B1
DATED          : May 20, 2003
INVENTOR(S)    : Yukitaka Tanaka and Fusatomo Miyake It is certified that error appears in the above-identified patent and that said Letters Patent is hereby corrected as shown below:

<u>Title page,</u>
Item [73], Assignee, "Yaichi" should read -- Aichi --.

Signed and Sealed this

Ninth Day of September, 2003

JAMES E. ROGAN
*Director of the United States Patent and Trademark Office*